United States Patent
Rosen et al.

(10) Patent No.: US 7,092,596 B2
(45) Date of Patent: Aug. 15, 2006

(54) REPETITIVE WAVEFORM GENERATOR RECIRCULATING DELAY LINE

(75) Inventors: Robert A. Rosen, Simi Valley, CA (US); Kapriel V. Krikorian, Oak Park, CA (US); Irwin L. Newberg, Pacific Palisades, CA (US)

(73) Assignee: Raytheon Company, Waltham, MA (US)

( * ) Notice: Subject to any disclaimer, the term of this patent is extended or adjusted under 35 U.S.C. 154(b) by 374 days.

(21) Appl. No.: 10/126,569

(22) Filed: Apr. 19, 2002

(65) Prior Publication Data

US 2003/0198432 A1    Oct. 23, 2003

(51) Int. Cl.
G02B 6/26 (2006.01)
G02F 2/02 (2006.01)

(52) U.S. Cl. ......................................... 385/27; 359/331
(58) Field of Classification Search .................. 385/27; 359/331–334
See application file for complete search history.

(56) References Cited

U.S. PATENT DOCUMENTS

| | | | | |
|---|---|---|---|---|
| 4,479,701 A | * | 10/1984 | Newton et al. ................ 385/24 |
| 4,671,605 A | * | 6/1987 | Soref ............................. 385/2 |
| 5,272,484 A | * | 12/1993 | Labaar ....................... 342/375 |
| 5,401,957 A | * | 3/1995 | Suzuki et al. .......... 250/227.21 |
| 5,786,930 A | * | 7/1998 | Takatsu et al. ............. 359/331 |
| 5,892,608 A | * | 4/1999 | Suzuki et al. ............... 398/202 |
| 6,078,416 A | * | 6/2000 | Yano .......................... 398/154 |
| 6,108,125 A | * | 8/2000 | Yano .......................... 359/344 |

* cited by examiner

*Primary Examiner*—Sung Pak
*Assistant Examiner*—Tina M. Wong
(74) *Attorney, Agent, or Firm*—Leonard A. Aikov; John E. Gunther; Karl A. Vick

(57) ABSTRACT

A recirculating delay line that includes an optical delay circuit generates repetitions of an input signal waveform that is of limited time duration.

20 Claims, 2 Drawing Sheets

REPETITIVE WAVEFORM GENERATOR RECIRCULATING DELAY LINE

TECHNICAL FIELD OF THE DISCLOSURE

This invention relates to repetitive waveform generators that can be employed in RF applications such as radar.

BACKGROUND OF THE DISCLOSURE

Advanced radar systems have significantly larger bandwidths and operate over a wide RF range, e.g., up to about 100 GHz in some applications. These advanced radar systems will need to generate ultra fast repetitive intrapulse frequency modulated waveforms.

A known technique of generating ultra fast repetitive intrapulse frequency modulated waveforms is to actually generate the basic waveform for each time it is repeated. However, errors can be introduced each time the basic waveform is generated and thus the repeating waveforms might contain excessive noise and not be identical.

There is accordingly a need for a repetitive waveform generator that generates substantially identical repeating waveforms.

SUMMARY OF THE DISCLOSURE

The disclosed invention generates substantially identical repetitions of a basic waveform by using a recirculating delay line. A basic waveform spectrum and envelope can be identically repeated many times to be used as a single or composite (made up of several repetitions) waveform for use in an RF system.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE DISCLOSURE

Figure 1:
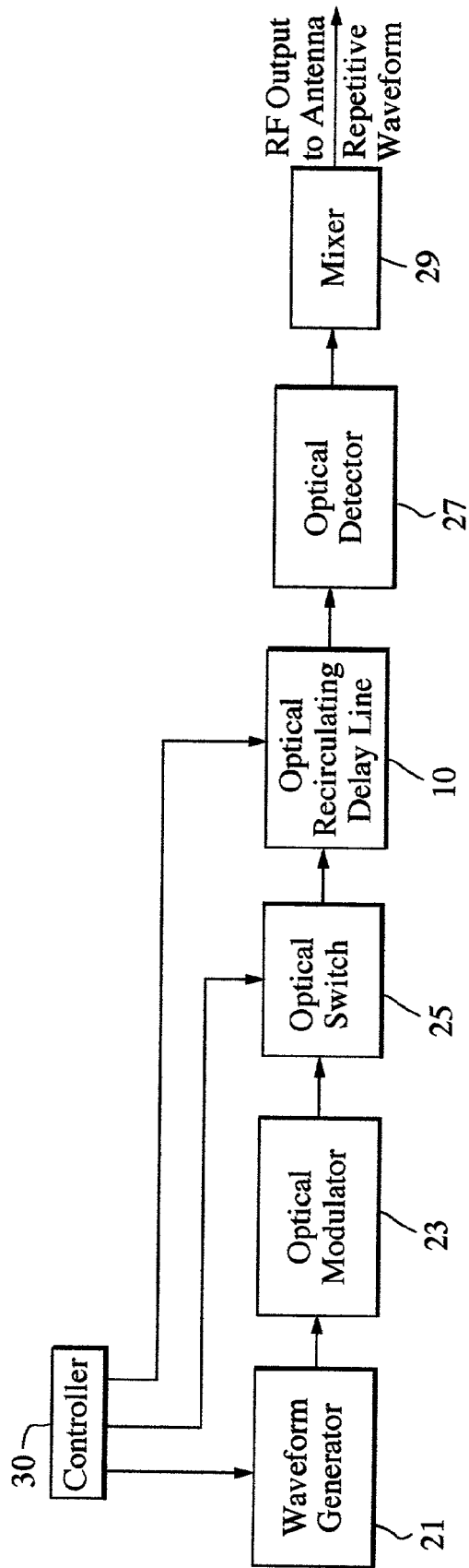
FIG. 1 is a schematic block diagram of a repetitive waveform generator.

FIG. 1 is a schematic block diagram of a repetitive waveform generator that includes an RF waveform generator 21 whose output is provided to an optical modulator 23 that provides an RF modulated optical signal to an optical switch 25. The output of the optical switch 25 comprises a basic waveform of limited duration that is intended to be repeated and is provided as an input to an optical recirculating delay line 10. The output of the recirculating delay line comprises repetitions of the basic waveform signal and is provided to an optical detector 27 that detects the RF modulation on the output of the optical recirculating delay line 10. The electrical RF output of the optical detector 27 can be appropriately converted by a mixer 29 to obtain a desired RF signal frequency that can be provided to an antenna, for example. A controller 30 controls the operation of the waveform generator, the optical switch 25 and the optical recirculating delay line 10.

The RF modulated optical signal provided by the optical modulator comprises an RF signal modulated on an optical carrier, and the frequency ranges for RF signals modulated on an optical carrier can be over a range from near DC to 100 GHz, for example, depending on the implementation of the optical modulator 23. The modulation of the optical carrier is optical amplitude modulation.

Figure 2:
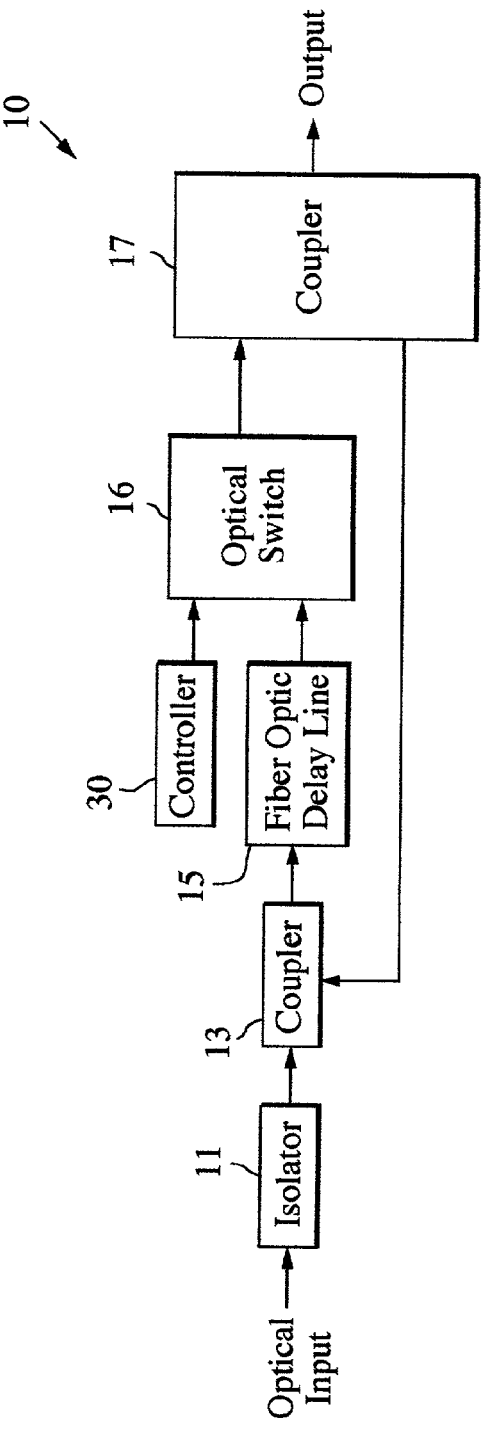
FIG. 2 is a schematic block diagram of the optical recirculating delay line of the repetitive waveform generator of FIG. 1.

FIG. 2 is a schematic block diagram of an implementation of the optical recirculating delay line 10 which includes an optical isolator 11 that receives the output of the optical switch 25 as an optical input. The output of the optical isolator 11 is provided as one input to an optical coupler 13 whose output is provided to a fiber optic delay line 15. The output of the fiber optic delay line 15 is provided to an optical coupler 17 via an optical switch 16. The optical coupler 17 provides the output of the optical recirculating delay line 10 and further provides a portion of the output of the fiber optic delay line 15 as another input to the coupler 13 that allows the output of the fiber optic delay line 15 to go back into the delay line. Coupling values are selected so that signal loss is small. Any RF signal loss in the output can be made up by using RF gain control.

In use, an RF signal that has a limited time duration, such as an RF pulse modulated on an optical carrier signal pulse, can be recirculated many times in the recirculating fiber optic delay line 10 of FIG. 2. The RF pulse length and optical pulse length can be substantially the same, and the delay of the delay line 15 can be substantially equal to the length of the RF pulse and the optical pulse. Modern waveform synthesizers can generate waveforms with complex modulations, and these waveshapes can be repeated using the recirculating fiber optic delay line to generate longer pulses formed of identical special RF spectrums. An advantage of using the recirculating delay line 10 to generate the waveform once rather than regenerating the basic waveform pulse each time to form a long pulse is that the technique will have less noise due to the nonregeneration of the basic waveform.

More particularly, since the output of the fiber optic delay line 15 is fed back as an input to the fiber optic delay line 15, by selecting the delay provided by the fiber optic delay line 15 to be substantially equal to the length or duration of the basic waveform desired to be repeated, the output of the delay line 15 comprises a replica of the basic waveform of limited time duration followed by successive replicas of fed back versions of the output of the delay line, wherein each fed back versions is based on the immediately preceeding delay line output waveform. Thus, the second output waveform of the delay line is a replica of the first output waveform of the delay line, the third output waveform is a replica of the second output waveform, and so forth. The optical switch 16 is employed to control the number of successive repetitions of the basic waveform that form a pulse that is comprised of a number of repetitions of the basic waveform. In other words, the optical switch is employed to clear the delay line by stopping recirculation.

Figure 4:
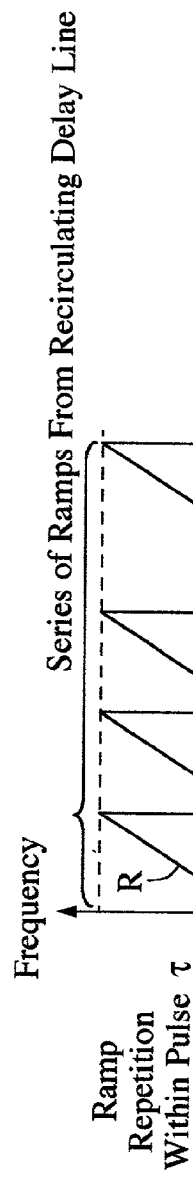
FIG. 4 schematically depicts the pulse timing of the waveform of FIG. 3.
Figure 3:
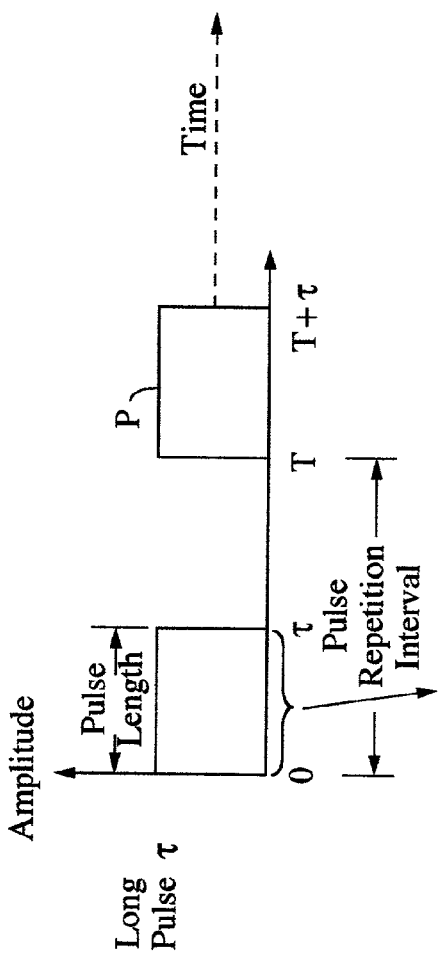
FIG. 3 schematically depicts an example of a repeating waveform that can be generated by the repetitive waveform generator of FIG. 1.

The repetitive waveform generator of FIG. 1 can be employed to generate a signal comprised of a series of "long pulses" each of which is comprised of repetitions of a basic waveform that is a "short pulse". A straightforward example of such a signal is a pulsed or gated series of intrapulse modulated chirp or ramp waveforms R as depicted in FIGS. 3 and 4. The term chirp or ramp describes a waveform that has a frequency that linearly increases (or decreases) with time. A ramp waveform R of duration $\theta_p$ is a short pulse that comprises an intrapulse modulated waveform (i.e., there is modulation within the pulse), and a pulse P of duration or length $\theta$ is a long pulse that comprises n repetitions of the intrapulse ramp waveform R such that the long pulse duration $\theta = n\theta_p$. The delay of the fiber optic delay line 15 is substantially equal to the $\theta_p$, the duration or length of the long pulse P is selected by controlling the optical switch 16 to transmit a selected number of ramp pulses. The number of basic waveform or short pulse repetitions in each long pulse is selected to achieve the desired average power. The long pulses P have a pulse repetition interval T that is selected by control of the waveform generator 21 and/or the optical switch 25. Within each long pulse P, the first chirp or ramp is based on a basic waveform input signal provided by the optical switch 25, while the subsequent ramps within a given pulse P are based on feedback from the output of the fiber optic delay line.

Thus, the purpose of the fiber optic delay line 15 is to repeat the RF signal a selected number of times to generate a longer pulse. In other words, there is a shorter pulse time that is repeated a number of times to generate a longer pulse to be used in the RF system. Timing and control of both the input RF pulse modulated on the optical carrier and of the recirculating delay line control both the short input pulse length and the number of recirculations of the short input pulse. The number of recirculations of the short pulse sets the length of the long pulse that contains a number of the short pulses. After the desired number of short pulses are generated by recirculating in the delay line, the controller 30 will send a signal to the optical switch 16 that will remove or clear the optical signal from the delay line, i.e., dump the delay line optical signal.

It should be appreciated that each long pulse P can be formed of repetitions of a different short pulse, and that the intrapulse RF modulation in the short pulse can be of any type, including noise. For example, an RF noise signal can be generated and time gated to generate a short noise pulse which can be input to the recirculating delay line to generate a long pulse of repeated noise pulses. The use of a recirculating delay line allows any complicated intrapulse modulation to be repeated, because of being recirculated. This known pulse that is repeated to make a long pulse can be processed in an RF system such as radar because the intrapulse modulation is known and repeated.

Figure 5:
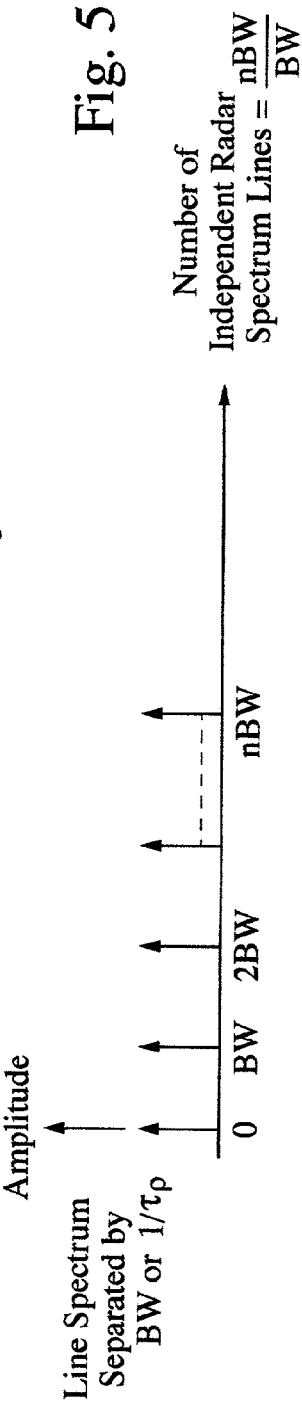
FIG. 5 schematically depicts the spectrum of the waveform of FIG. 3.

The waveform of FIGS. 3 and 4 provides a nearly flat power spectral density across a wide bandwidth, and can be advantageously employed in radar systems. The waveform spectrum generated by recirculating the basic chirp has a spectrum line spacing equal to the fast chirp bandwidth $BW=1/\theta$ as depicted in FIG. 5. In other words, the waveform of FIGS. 3 and 4 generates a set of RF signals that are narrow in bandwidth (meaning a line in the frequency spectrum) and are multiples of $1/\theta_p$ in frequency. To achieve range resolution when the waveform is processed, a long ramp with a bandwidth equivalent to the desired radar range resolution can superposed over the duration of the pulse. For example, an RF ramp can be mixed with the series of pulses that are output as detected RF pulses from the recirculating delay line.

Different spectrums that are not line spectrums would be generated by other types of intrapulse modulation. It should be appreciated that persons skilled in the art can determine the wave shape and thus the spectrum desired. The recirculating delay line provides a way to generate different desired spectrums.

The transmitted sequence may be stored in a long recirculating delay line so it then can be correlated with the received signal to form matched filters. For the noise case, this is the most direct way to obtain optimum receiver performance.

Thus, in summary the use of a fiber optic recirculating delay line can generate a large variety of special waveforms with wide RF spectrums that can be used in a radar system to enhance its performance in many of the radar modes. The use of fiber optics for the recirculating delay line with its low loss in the fiber and its wide bandwidth capability allows the generation of any repetitive type radar waveforms whose basic intrapulse waveform can be generated. The other uses of a repetitive signal are in radar signal processing where integration of both amplitude and frequency modulated RF pulses are performed. Use of the recirculating delay line in signal processing to produce substantially the same output as a conventional tapped delay line, where the time delay is equal to the radar pulse repetition period and each output can be amplitude weighted, allows for performing RF operations such as filtering, etc.

For short delays, used to generate short pulses, the loss in the fiber is very small, 0.5 dB/Km, where 1 Km provides 5 microseconds of delay. For very long delays the use of an optical amplifier in the recirculating delay line will compensate for the loss.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A repetitive waveform generator comprising:
an RF waveform generator for generating an RF waveform signal;
an optical modulator for generating an input optical signal responsive to said RF waveform signal;
a first optical coupler for providing a first optical coupler output responsive to said input optical signal and an optical feedback signal;
an optical delay circuit responsive to said first optical coupler output and providing a delayed version of said first optical coupler output as an optical delay circuit output; and
a second coupler responsive to said optical delay circuit output for providing an optical output signal, and for providing a portion of said optical delay circuit output as said optical feedback signal to said first coupler:
an optical detector providing an RF repetitive waveform output responsive to said optical output signal;
wherein said RF repetitive waveform output comprises a replica of said RF waveform signal and a series of copies of said replica.

2. The repetitive waveform generator of claim 1, wherein said RF waveform signal has a predetermined duration.

3. The repetitive waveform generator of claim 1, wherein said RF waveform signal has a limited duration.

4. The repetitive waveform generator of claim 1, wherein the RF waveform signal comprises a chirp.

5. The repetitive waveform generator of claim 1, wherein the RF waveform signal comprises RF noise.

6. A repetitive waveform generator comprising:
   an RF waveform generator for generating an RF waveform signal;
   an optical modulator for generating an input optical signal responsive to said RF waveform signal;
   a first optical coupler for providing a first optical coupler output responsive to said input optical signal and an optical feedback signal;
   an optical delay circuit responsive to said first optical coupler output and providing a delayed version of said first optical coupler output as an optical delay circuit output; and
   a second coupler responsive to said optical delay circuit output for providing an optical output signal, and for providing a portion of said optical delay circuit output as said optical feedback signal to said first coupler;
   wherein said optical output signal comprises a replica of said input optical signal and a series of copies of said replica.

7. The repetitive waveform generator of claim 6, wherein said RF waveform signal has a predetermined duration.

8. The repetitive waveform generator of claim 6, wherein said RF waveform signal has a limited duration.

9. The repetitive waveform generator of claim 6, wherein the RF waveform signal comprises a chirp.

10. The repetitive waveform generator of claim 6, wherein the RF waveform signal comprises RF noise.

11. A repetitive waveform generator comprising:
    a circuit for generating an input optical signal;
    a first optical coupler for providing a first optical coupler output responsive to said input optical signal and an optical feedback signal;
    an optical delay circuit responsive to said first optical coupler output and providing a delayed version of said first optical coupler output as an optical delay circuit output; and
    a second coupler responsive to said optical delay circuit output for providing an optical output signal, and for providing a portion of said optical delay circuit output as said optical feedback signal to said first coupler;
    an optical detector providing an RF repetitive waveform output responsive to said optical output signal;
    wherein said optical output signal comprises a replica of said input optical signal and a series of copies of said replica.

12. The repetitive waveform generator of claim 11, wherein said RF waveform signal has a predetermined duration.

13. The repetitive waveform generator of claim 11, wherein said RF waveform signal has a limited duration.

14. A repetitive waveform generator comprising:
    a circuit for generating an optical input signal having a duration $\tau_p$;
    a first optical coupler for providing a first optical coupler output signal responsive to said optical input signal and responsive to an optical feedback signal;
    a fiber optic delay line for providing a delayed version of said first coupler output signal, wherein the delayed version of said first coupler output signal is delayed by a time substantially equal to the duration $\tau_p$;
    a second optical coupler for providing an output optical signal responsive to said delayed version of said first coupler output signal, and for providing a portion of said delayed version of said first coupler output signal as the optical feedback signal; and
    an optical switch for controlling the output optical signal to have a duration $\tau$, wherein the duration $\tau$ substantially equals $nX\tau_p$, and wherein the output optical signal comprises a series of about n replicas of the optical input signal.

15. The repetitive waveform generator of claim 14, wherein the optical switch is arranged between the fiber optic delay line and the second optical coupler.

16. The radar system of claim 15, wherein the optical recirculating delay line comprises a switch arranged to transmit a selected number of repetitions of the waveform.

17. The radar system of claim 15, wherein the optical recirculating delay line comprises a first optical coupler responsive to the optical signal pulse and responsive to a feedback signal, and comprises a second optical coupler responsive to a first optical coupler output and for providing a feedback signal.

18. A radar system comprising:
    a waveform generator for generating an input RF signal:
    an optical modulator for providing an RF modulated optical signal corresponding to the input RF signal, wherein the RF modulated optical signal is modulated by a portion of the RF signal;
    an optical switch having an input coupled to the RF modulated optical signal and an output for providing an optical signal pulse with a predetermined duration T and a waveform;
    an optical recirculating delay line responsive to the optical signal pulse, wherein the optical recirculating delay line provides a delay line output signal which comprises a plurality of repetitions of the waveform;
    an optical detector for detecting the delay line output signal and providing an output RF output signal comprising a series of replicas of the portion of the input RF signal.

19. A repetitive waveform generator comprising:
    a circuit for generating an optical signal having a predetermined duration, said optical signal comprising an optical carrier pulse, or an RF signal modulated on an optical carrier pulse, or an RF pulse modulated on an optical carrier signal, or a frequency modulated RF pulse modulated on an optical carrier signal, or a chirp, or noise modulated on an optical carrier signal, or RF noise modulated on an optical carrier signal;
    a first optical coupler responsive to said optical signal and an optical feedback signal;
    an optical delay circuit responsive to said first optical coupler and providing a delayed version of said first coupler output as an optical delay circuit output; and
    a second coupler responsive to said optical delay circuit output for providing a waveform generator output, and for providing a portion of said optical delay circuit output as said optical feedback signal to said first coupler;
    wherein said first coupler provides said feedback signal to said optical delay circuit; and
    whereby said waveform generator output comprises a replica of said input optical signal and a series of copies of said replica.

20. An optical recirculating delay line comprising:
    a first optical coupler for receiving an input optical signal of limited duration that is to be repeated a predetermined number of times, and further for receiving a feedback signal, said input optical signal comprising an optical carrier pulse, or an RF signal modulated on an optical carrier pulse, or an RF pulse modulated on an optical carrier signal, or a frequency modulated RF pulse modulated on an optical carrier signal, or a chirp, or noise modulated on an optical carrier signal, or RF noise modulated on an optical carder signal;

a fiber optic delay circuit responsive to said first optical coupler output and providing a delayed version of said first optical coupler output as a fiber optic delay circuit output; and a second optical coupler responsive to said fiber optic delay circuit output and providing a waveform generator output and a portion of said fiber optic delay circuit output that is provided as said feedback signal to said first optical coupler;

whereby said waveform generator output comprises a replica of said input signal and a series of copies of said replica.

* * * * *